(12) United States Patent
Mashinsky et al.

(10) Patent No.: US 9,256,905 B2
(45) Date of Patent: *Feb. 9, 2016

(54) INTELLIGENT ROUTING OF ELECTRIC POWER

(75) Inventors: Alex Mashinsky, New York, NY (US); Eng K. Chi, Wayne, NJ (US)

(73) Assignee: PARADIGM SHIFTING SOLUTIONS, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/229,706

(22) Filed: Aug. 26, 2008

(65) Prior Publication Data

US 2008/0319893 A1    Dec. 25, 2008

Related U.S. Application Data

(63) Continuation-in-part of application No. 09/939,917, filed on Aug. 27, 2001.

(60) Provisional application No. 60/228,275, filed on Aug. 25, 2000.

(51) Int. Cl.
*G06Q 40/00* (2012.01)
*G06Q 40/04* (2012.01)
*G06Q 50/06* (2012.01)

(52) U.S. Cl.
CPC ............... *G06Q 40/04* (2013.01); *G06Q 50/06* (2013.01)

(58) Field of Classification Search
USPC .............................................. 705/35, 37, 36 R
See application file for complete search history.

(56) References Cited

U.S. PATENT DOCUMENTS

| | | | |
|---|---|---|---|
| 645,576 A | 3/1900 | Telsa | |
| 1,119,732 A | 12/1914 | Tesla | |
| 5,873,251 A | 2/1999 | Iino | |
| 6,240,400 B1 * | 5/2001 | Chou et al. | 705/37 |
| 6,598,029 B1 | 7/2003 | Johnson et al. | |
| 2001/0049651 A1 * | 12/2001 | Selleck | 705/37 |

* cited by examiner

*Primary Examiner* — Lalita M Hamilton
(74) *Attorney, Agent, or Firm* — Barnes & Thornburg LLP; Thomas J. McWilliams; Edward F. Behm, Jr.

(57) ABSTRACT

A method and system for dynamically routing electric power in real time in accordance with parameters submitted by buyers and sellers of electric power using a feedback control scheme. A control node is arranged for receiving the parameters via a wide area network and to generate a route plan based on the parameters as well as current supply and demand in a network. The control node is also connected to the transmission and distribution systems to dynamically route electric power between matched buyers and sellers to effect the route plan.

42 Claims, 8 Drawing Sheets

INTELLIGENT ROUTING OF ELECTRIC POWER

CROSS REFERENCE TO RELATED APPLICATIONS

The present application is a continuation-in-part to U.S. patent application Ser. No. 09/939,917 filed on Aug. 27, 2001 which claims priority from U.S. Provisional Patent Application Ser. No. 60/228,275 filed on Aug. 25, 2000.

The present application also claims benefit to U.S. Provisional Application No. 60/967,819 filed on Sep. 7, 2007, U.S. Provisional Application No. 61/015,023 filed on Dec. 19, 2007, and U.S. Provisional Application No. 61/091,460 filed on Aug. 25, 2008.

BACKGROUND OF THE INVENTION

1. Field of the Invention

The present invention relates to electric power transmission and distribution and, in particular, a method and system for the intelligent routing of electric power based on market supply and demand.

2. Description of the Related Art

The North American power grid is an interconnected system of many regional power grids, i.e., electric power transmission and distribution systems. Each transmission and power distribution system is traditionally owned and operated by an electric utility and includes a generating system, a transmission system, a distribution system, and a control center. The interconnection of the transmission systems forms the power grid and permits the interchange of electricity between the various electric utilities. The electric utilities have generally operated as vertically integrated local monopolies by producing or purchasing electric power to serve all the users within the geographic boundaries of their transmission and distribution system. Presently, almost all end users purchase electric power from their local electric utilities serving their geographic areas.

The control center of each regional power grid monitors the generating plants, transmission systems, distribution systems, and customer loads. The control center may also provide automatic control of field equipment, for example, in response to an emergency shutdown of a generating facility.

Recent Federal legislative and regulatory activities and market place forces are significantly changing the electric power industry such that the traditional monopolistic attributes of electric utilities are yielding to free market forces. Several states have adopted legislations to deregulate the electric power industry. The legislation has created three types of participants within each transmission and distribution system previously controlled by one vertically integrated electric utility: electric power generators, transmission companies, and distribution companies.

One of the primary aims of electric power deregulation efforts is to reduce energy prices to customers by introducing competition among power generators and other service providers (Power generators include resellers or companies that own generating facilities). As competition increases, power generators are expected to offer prospective customers various pricing plans premised, for example, on volume and term commitments, and peak/off-peak usage.

Under current deregulation schemes, local distribution company facilities of the local electric utility will continue to be a government-regulated monopoly within the region it serves. These facilities are primarily the wires and other equipment constituting the local power grid over which electric power is transmitted to end user locations.

To date, an active wholesale market exists for electric power. Power generators, distribution companies, resellers, independent traders and brokers actively buy and sell electric power in a wholesale market. A power generator may wish to sell excess generating capacity not required for its own operations or not contractually committed to any customer, or may need to purchase additional power to satisfy its generating commitments. A local electric utility may need to sell excess generating capacity (from its own generating plants) or buy power from nearby utilities, resellers, traders or brokers to cover a shortfall in its own supply (e.g., during certain peak periods). Resellers and traders may need to fulfill take-or-pay or supply contracts they have with power generators, local utilities or each other or to trade derivatives based on speculation about the future price of power in the spot market.

Under the current scheme, consumers are grouped in a power exchange to collectively buy power. An operator of the power exchange will assess the next day's power supply requirements by asking power generators (all entities willing to supply electric power to the exchange) to submit asking prices for specified quantities of power to be delivered to the power grid during each hour of the next day. Starting with the lowest asking price, the exchange operator matches the assessed needs for power against the offered power until it has sufficient power to meet the assessed needs.

In the wholesale power market, the power must be transferred over the interconnected transmission systems or regional power grids. Buyers typically take title to the purchased electric power at well-established interfaces or transfer points on a regional power grid (e.g., the Oregon-California border). However, the purchase arrangement may call for title to be passed at some alternate point, such as (i) the point on the regional grid nearest the seller's generating facility or (ii) if the buyer is a local distribution company, the point(s) on its local grid where the grid interfaces with the power grids of neighboring utilities. Before this power can be delivered to the buyer at the agreed transfer point, the seller must schedule a "contract path" for this power to travel from the seller's generating facility (or the point at which the seller is to take title if the seller purchased this power from another source) to the transfer point. The buyer must, in turn, schedule a transmission path from the transfer point to the buyer's own grid interface (if the buyer, for example, is a local distribution utility) or, if the buyer is reselling this power to another party, to a transfer point agreed to by such other party. Scheduling contract or transmission paths is usually coordinated through the regional grid controller(s) for the power grids over which this power is to be transmitted. The regional grid controller manages one or more local power grids, keeping demand on the combined grid in balance with available supply at all times. Generally, the affected power grids are those owned and controlled by the electric utilities whose service areas are situated between the source of this power and the transfer point. The charges for transmission of the purchased power to and from the point at which title is passed are normally borne by the seller and buyer, respectively.

The present control systems and transmission and distribution infrastructures do not allow users to automatically and dynamically route electric power based on settled trades in the spot and futures market. Accordingly, an online trading and dynamic control system is required for automatically and dynamically configuring an electric network to route electric power between buyers and sellers as well as performing clearinghouse or settlement functions for the buyers and sellers.

SUMMARY OF THE INVENTION

An object of the present invention is to provide a method and system for facilitating online trading of electric power and for dynamically routing the power based on settled trades in the spot and futures market.

Another object of the invention is to enable users to more cost-effectively manage their energy consumption over time based on the prevailing market price of electricity.

Still another object of the invention is to encourage greater competition and liquidity among entities operating power generation, transmission and distribution systems by providing an efficient online platform capable of settling transactions among these players and the automated execution and delivery of the transacted electric services.

Yet another object of the invention is to provide a sub-grid or sub-network feedback control system for control at the individual end-user level such that the online platform may control and route in real time the appropriate amount of electricity from the matched sellers to corresponding buyers or end users and that the stability and reliability of the overall regional networks are enhanced, thereby minimizing the risk of cascading failures.

Still another object of the invention is to provide an online platform that would enable users of renewable energy such as solar and wind power to also sell surplus energy to their utility companies or other buyers.

Yet another object of the invention is to provide a global transmission and distribution network that would enable buyers and sellers around the world to trade electric power efficiently and cost-effectively.

According to an embodiment of the present invention, a system enables buyers and sellers to electronically and anonymously trade electric power and physically deliver the purchased electric power in real time. The system also actively manages the reliability of the transmission network using a feedback control scheme, as it routes the electric power.

In a presently preferred embodiment, the system includes a control node, a switch controller, an electric network, and switching devices. The control node collects bids and asks from buyers and sellers of electric services through a wide-area network such as the Internet. The control node matches the bids and asks and produces a route plan, at predetermined periods of time, based on parameters specified in the matched bids and asks. In generating the route plan, the control node takes into account the supply and demand on the system by matching loads and resources of the system on a real-time basis.

The control node according to an embodiment of the present invention allows buyers to directly bid on the spot market power exchange and allows sellers to directly input asking prices for the power they supply so that the control node dynamically connects a buyer with the seller with the lowest asking price. If at a later time, another provider becomes available that has a lower asking price, the control node automatically switches to the new supplier. Of course all dynamic spot market buyers will want the provider with the lowest asking price. In one embodiment, the buyers connected to one node may equally share the power from the provider with the lowest available asking price. In this scenario, each user is supplied by various suppliers. Alternatively, the buyers may share the power from one provider in which the size of the share is based on the size of the power requirement of each buyer. For example, if there are only two buyers and the first buyer requires twice the amount of power as the second buyer, the first buyer receives ⅔ of the power from the provider with the lowest asking price and the second buyer receives ⅓ of the power from that provider.

In a further embodiment, the buyers may be entitled to receive power from the lowest asking price provider based on some type of hierarchy, priority or predetermined criteria. For example, the buyer with the highest demand for power may be entitled to the lowest asking price.

In yet another embodiment, each buyer is associated with (i) a previously registered identification code, (ii) a power usage meter or sensor communicable with the control node, and (iii) a switch agent controlled by the control node. Advantageously, in a power shortage situation, a buyer such as a medical service provider will get higher priority over typical households in its bids for power as the control node can identify such users through their registered identification codes and distribute power to the medical service provider through selective activation of switches in the transmission and distribution networks.

In another embodiment, buyers who are also end users communicate their energy usage using wired and/or wireless means to communicate with the control node so that the control node may adjust the route plan as required. Preferably, the system employs a combination of WiFi and Power Line Carrier communication technologies to cost-effectively transmit the sensor feedback data to the control node.

A switch controller of the transmission network receives the route plan from the control node and sends control signals to the switching devices on the electric network so as to route power from the sellers to the buyers according to the route plan. The electric network is responsive to electronic commands for routing power according to the route plan. The electric network may be configured as alternating current (A/C), direct current (D/C), or a hybrid (i.e. a combination of A/C and D/C) power transmission system. In the case of A/C transmission systems, TRIAC, silicon controlled rectifier (SCR) or mechanical switches may be used for switching power to and from the buyers and sellers.

In a particularly preferred embodiment, the electric network is configured as a high-voltage direct-current transmission system and the switching devices are semiconductor-based (e.g., silicon carbide) such that the flow and level of electric power can be controlled precisely and rapidly. The electric network further includes feedback sensors for monitoring the performance and efficiency of the network and for measuring actual supply and demand of electric power on the network. The control node receives measurements from the feedback sensors and adjusts the route plan and thus the power flow to various grids of the electric network so as to balance the load and resources on the network. The feedback sensors may be located anywhere in the network including end-user premises. Communication between the sensors and the control node may be conducted via power lines using power-line-carrier (PLC) communication technologies, which may also be known as power line carrier, mains communication, power line telecom (PLT), or power line networking (PLN). Preferably, in the case of end users, feedback sensor signals may be communicated to the control node using a combination of wireless access points and broadband power line (BPL) protocol. The wireless access points would gather information from the end users without introducing electronic noise generated by household appliances and would eliminate the need for expensive repeaters for boosting BPL signals as transformers act as low-pass filters due to their high inductance. BPL would be used as backhaul for the signals gathered by the wireless access points.

In one embodiment, the control node includes a deal maker module, a route plan generator, a feedback controller, a switch agent, and an accounting module. The deal-maker module uses conventional algorithms to match bids and asks from buyers and sellers, and execute transactions so as to form legally binding contractual relationships between the matched buyers and sellers. In the case where the bids and asks include pricing and scheduling information, the deal-maker module matches the bids and asks based on the pricing and scheduling information. The route plan generator produces a route plan based on the matched bids and asks. The switch agent executes the route plan by actuating the switching devices in the electric network. The feedback controller or the control node performs real-time balancing of load and power generation based on feedback data from the feedback sensors. The accounting module computes and settles the trades based on the buyers' usage of electric services as measured by the feedback sensors such as electricity or energy meters that are capable of automatically sending usage information in real time to the control node.

In another embodiment, the control node includes a web matching engine that includes a trading layer having a Business Management Layer and a Service Management Layer, and a Service Delivery Layer. The Business Management Layer provides order management, matching, billing, settlement and reconciliation, rating and risk management, report, and accounting function. The Service Management Layer includes data collection, route plan generation, order execution, tracking and reporting, usage mediation, quality assurance, and trouble ticketing. The Service Delivery Layer includes servers of the Buyers and Sellers for managing the delivery of electric power, and provides route plan generation, power generation, certificate and authentication management, and delivery and report. The Business Management Layer is connected to the Service Delivery Layer via a Data Warehouse. The Service Management Layer is in operative communication with the Service Delivery Layer. The Web Matching Engine operates in several levels based on the customers needs, some examples of such operations are listed below:

Just match potential publishers;
Match and connect electronically;
Match connect and delivery the electric power;
Match connect, deliver and bill;
Match connect, deliver, bill and collect; and/or
Automatically match, connect, bill, deliver, measure, publish transaction information, change allocations, start over and at the end of the period, collect payments.

In addition, the web matching engine includes a Buyer and Seller transaction feedback loop which will rank the relationship and experience of different members with each other.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
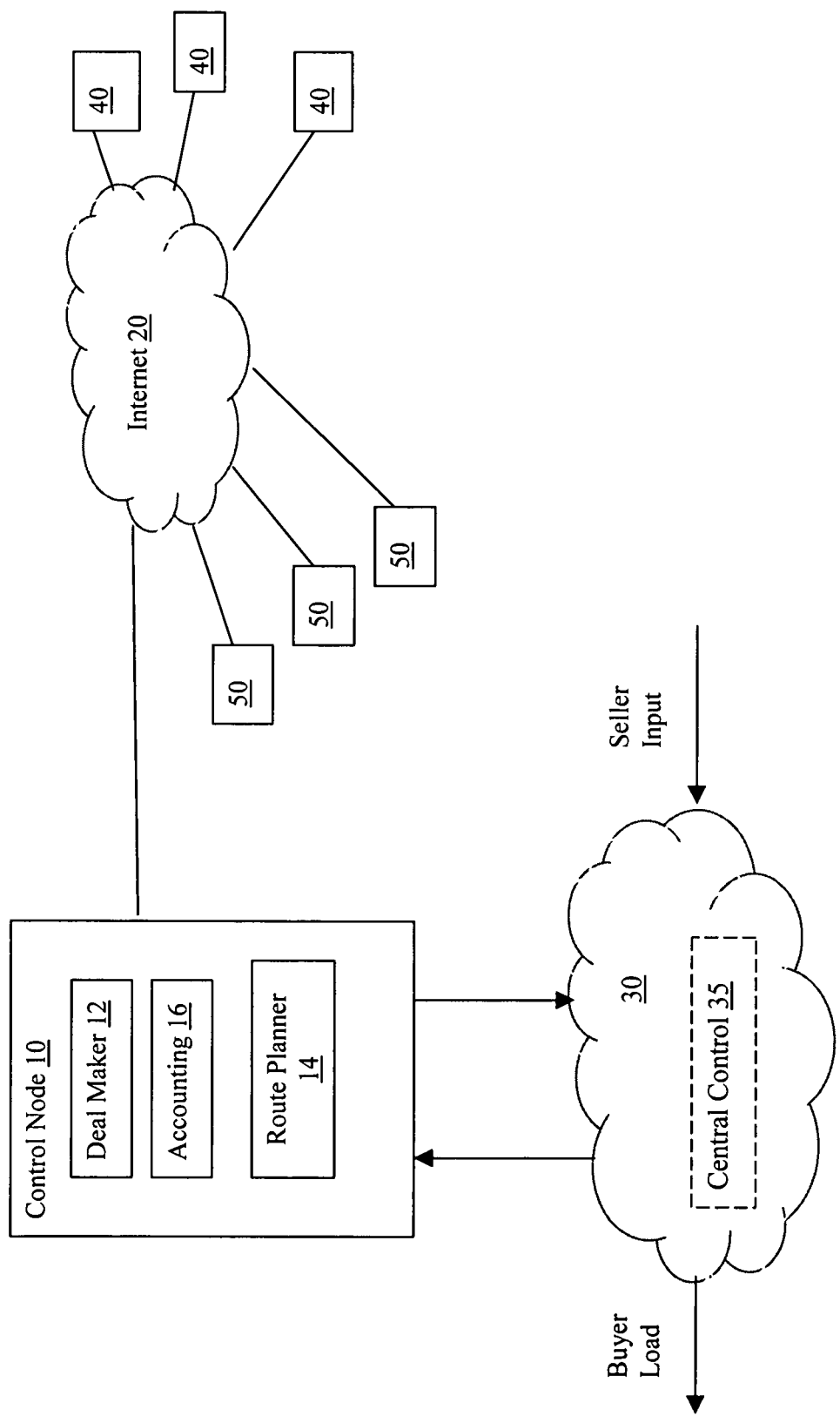
FIG. 1 is a block diagram of an embodiment of the trading system of the present invention.

FIG. 1 depicts a schematic diagram of an embodiment of the online trading system comprising a control node 10 connected to a wide area network such as the internet 20 and to an electric power transmission network 30. The electric power transmission network 30 includes a transmission network that conducts the flow of electricity from points of generation to points of distribution. In addition, the electric power transmission network may also include a distribution system that delivers the electric power to consumers.

According to the present invention, buyers use, for example, wireline or wireless terminals 40 to input bids and sellers use their own terminals 50 to input asks in a spot or futures market. The control node 10 comprises a deal-maker module 12 which receives the bids and asks and determines matches. As defined herein, the term 'buyers" are not restricted to wholesale buyers but may also refer to end users or electricity retailers (i.e., the entities responsible for the final stage of delivering electricity to the end users). Moreover, a buyer may also be a seller—as in the case where end users with renewable energy resource such as solar power may become a net energy source or producer at different times of the day.

The control node 10 further comprises a route planner 14 for generating a route plan for the settled trade, i.e., a matched bid and ask, and transmits the route plan for the matched bids and asks. The route planner 14 is connected to a dispatch center or central control 35 of the electric power transmission network 30 which provides supply and demand information to the route planner 14 via a feedback loop. Accordingly, the route planner 14 determines whether a matched bid and ask, i.e., settled trade, is possible based on the current supply and demand on the electric power transmission network 30. Once the route planner 14 determines that the settled trade is possible, the route planner 14 transmits the route to the central control 35 to implement the settled trade. The central control 35 controls a switch agent to make any switches necessary to deliver the seller (power generator) to the buyer (consumer) to effect the settled trade. Accordingly, the control node 10 matches loads and resources of the electric power system on a real time basis. An accounting module 16 computes and settles the trades based on the buyers' usage of electric services as measured by the feedback sensors.

The electric power transmission network 30 may comprise AC, DC, or a hybrid system. In a preferred embodiment, the electric power transmission network comprises a high-voltage direct-current (HVDC) system with switch devices including power semiconductors, e.g., thyristors or high voltage switches, for switching power.

The deal-maker module 12 may optionally also consider scheduling information for generating conventional settled trades on an advanced basis, i.e. futures contracts.

Although the control node 10 is shown as separate from the central control 35 of the network, the control node 10 may be integrated in the central control 35. As such, the term "control node" also refers to the combined functions of these merged functional blocks.

Figure 2A:
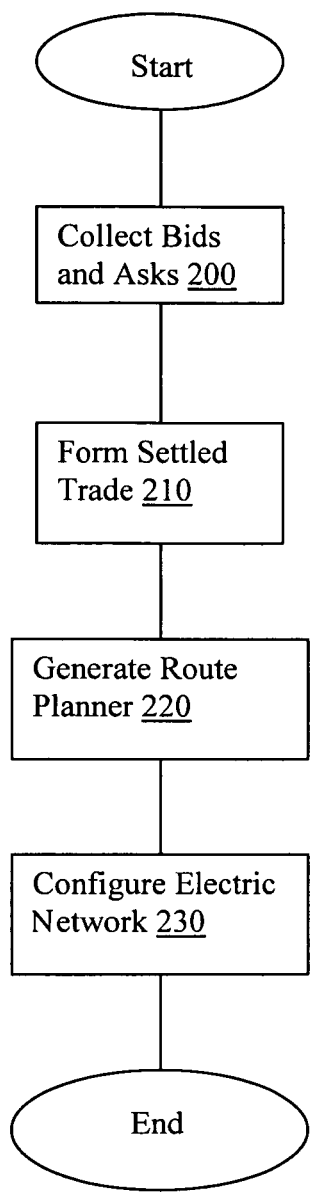
FIG. 2A is a flow diagram of a method for dynamically trading electric power according to the present invention.

Referring to FIG. 2A, a method according to the present invention for facilitating trading of electric power includes collecting by the control node 10 bids and asks from buyers and sellers of electric power, step 200. The control node then matches the collected bids and asks to form a settled trade, step 210. The control node 10 then generates a route plan based on the settled trade, step 220. If a route is available from the provider to the buyer, the control node configures an electric network to route electric power according to the generated route plan, step 230.

The control node according to the present invention allows buyers to directly bid on the spot market power exchange and allows sellers to directly input asking prices for the power they supply so that the control node 10 dynamically connects a buyer with the seller with the lowest asking price. Optionally, the control node may connect a buyer with the highest quality seller based on, for example, quality parameters such as reliability index, voltage variances, and other parameters known to persons of ordinary skill in the art. If at a later time, another provider becomes available that has a lower asking price, the control node automatically switches to the new supplier. Oftentimes, spot market buyers will want the provider with the lowest asking price. Therefore, all the buyers connected to the control node may equally share the power from the provider with the lowest available asking price. In this scenario, each user is supplied by various suppliers. Alternatively, the buyers may share the power from one provider in which the size of the share is based on the size of the power requirement of each buyer. For example, if there are only two buyers and the first buyer requires twice the amount of power as the second buyer, the first buyer receives twice as much power from the provider with the lowest asking price as the second buyer.

In yet another embodiment, the buyers may be entitled to receive power from the lowest asking price provider based on some type of heirarchy or priority. For example, the buyer with the highest demand for power may have priority to the power from the provider with the lowest asking price. In this embodiment, the buyers with the highest demands receive power from the provider with the lowest asking price. Then the power of the provider with the second lowest asking price is distributed to those of the remaining buyers with the highest demands. This process continues until there is no available power left or until there is no demand left. Another criterion would be based on the criticality of the end users (e.g., hospitals), which information is supplied by the users and associated with the registration codes provided at the time user registration on the system.

Figure 2B:
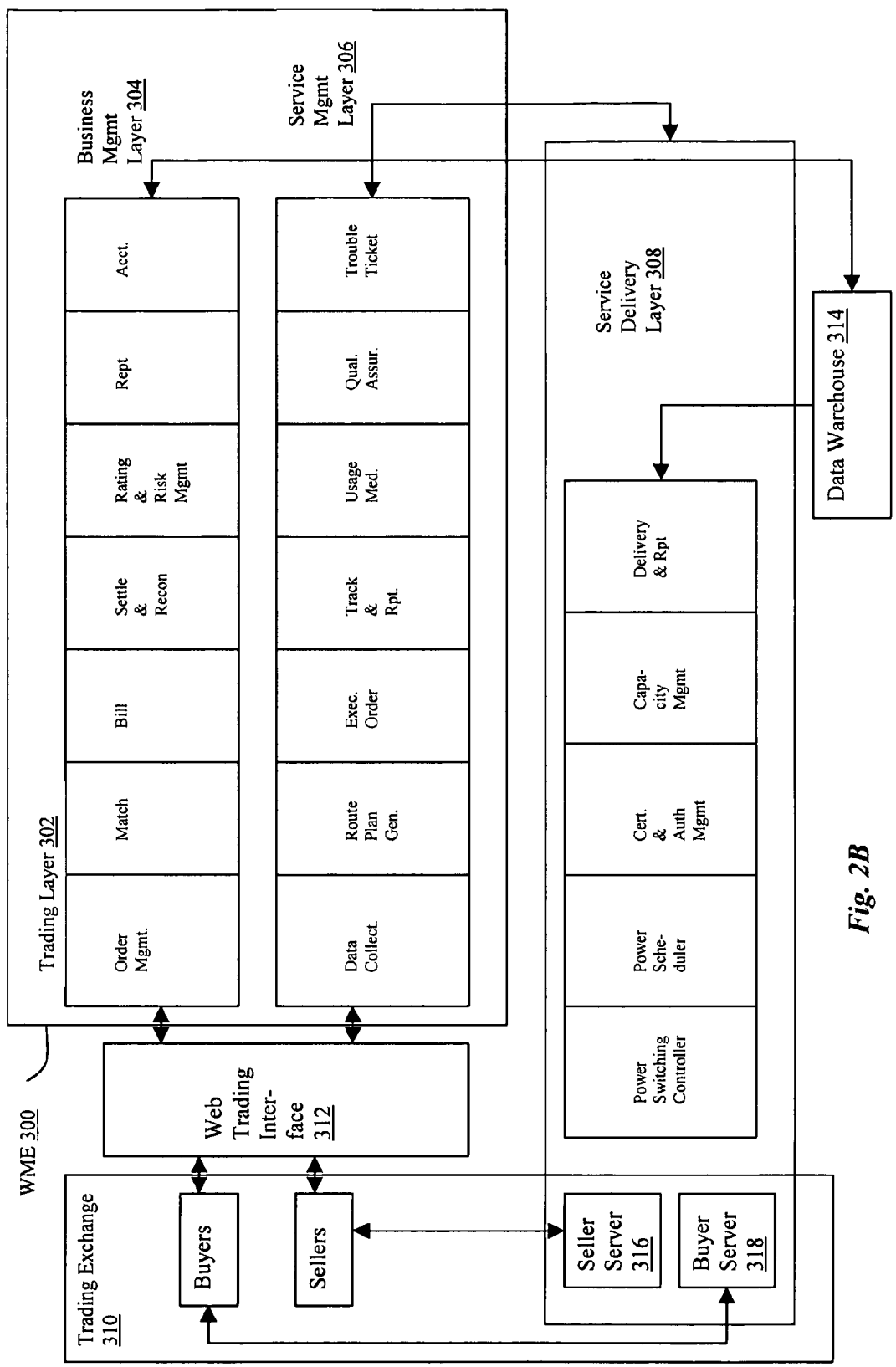
FIG. 2B illustrates the different operating layers of the web matching engine according to an embodiment of the present principles.

FIG. 2B schematically illustrates a web matching engine 300 according to an embodiment of the invention. In particular, FIG. 2B shows the two (2) operating layers of the web matching engine 300. There is the trading layer 302 that is made up of a business management layer 304 and a service management layer 306, and a service delivery layer 308. The buyers and sellers and their respective servers are members of the trading exchange 310. The buyers and sellers are connected to the trading layer 302 via the web trading interface 312 and the service delivery layer 308. The web trading interface 312 is preferably a website or web-based application that allows the buyers and sellers to enter their orders, and to view the status of their orders and all relevant financial and performance information relating to the same. Each of the layers is connected to a data warehouse 314 which collects information relating to each and every transaction conducted by the buyers and sellers. The business management layer 304 of the trading layer 302 can include order management, matching of orders to prospective buyers, billing, settlement and reconciliation, rating and risk management, reporting and financial accounting. The service management layer 306 performs data collection, match plan generation, issues orders to move media and/or digital goods, track and report transactions, usage mediation, quality control or assurance and trouble ticket handling. The service delivery layer 308 includes buyer and seller servers 316 and 318 respectively, for managing their electric power, the electric power scheduler, electric power switching controller for switching power to various buyers and sellers, certificate and authentication management for authenticating buyers and sellers, capacity management for managing load capacities of various buyers and sellers, and delivery and reporting to the respective networks and buyers and sellers of the marketplace.

Figure 3:
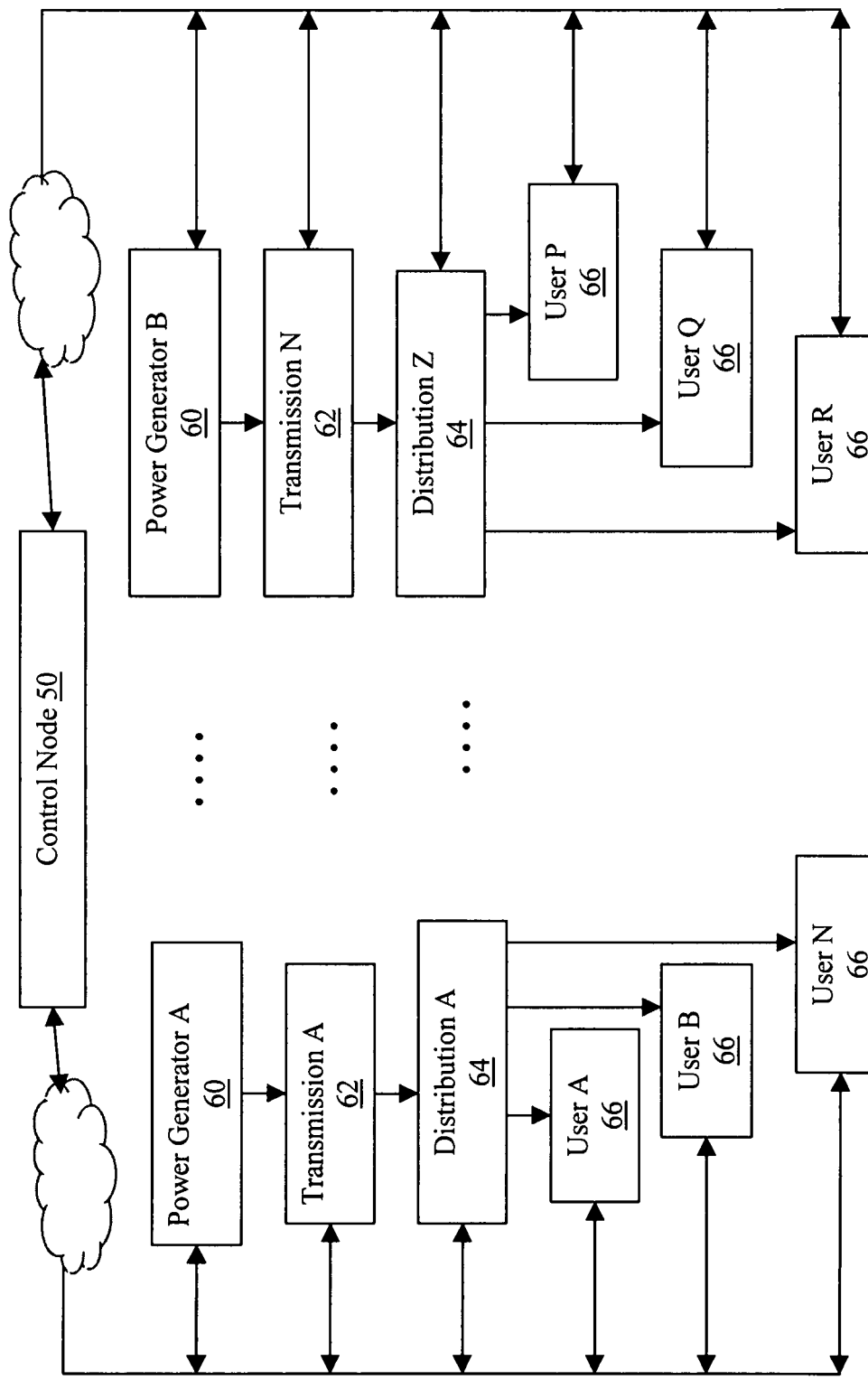
FIG. 3 is a schematic diagram of another embodiment of the invention.

FIG. 3 depicts diagrammatically the interconnections among the control node 50, the power generators 60, transmission 62 and distribution systems 64, and the end users 66 (or consumers) according an embodiment of the present invention. The control node 50, which incorporates the combined functions of the control node 10 and the central control 35 of FIG. 1, monitors the status of each of the aforementioned entities using wired or wireless means by receiving status signals from each feedback sensor connected to each such entity. The information feedback from the end user 66 would include, among other pertinent information, the amount of power consumed. Applying the matched or agreed rate to the power consumed, the accounting module of the control node computes the electricity cost for the buyer (i.e., the end user in this example) and display such information to the user who may use it for cost optimization. The feedback signal may be transmitted to the control node 10 via wired or wireless means. Preferably, a WiFi transceiver located at or near the end user receives a signal indicating the usage of the end user from a feedback sensor located on the user's premises and transmits the information to a wireline transceiver, which then transmits the information via the power lines using protocols such as the BPL protocol. This transmission method is preferred over a power-line only transmission path as numerous expensive repeaters would be required to overcome the attenuation of high frequency signals by the transformers for stepping down the supply voltage to a level usable by the devices of each end user. Employing wireless means at the end user premises also would avoid contaminating the feedback signal by the power line noise generated by the turning on and off of the various electrical appliances devices or appliances.

Preferably, each end user or group of end users may be provided with an addressable switch (e.g., silicon-based TRIAC or SCR or a mechanical one) in operative communication with the control node such that the control node may activate or deactivate power to the end user(s) if the network suffers instabilities or switch power to a different distribution system in accordance with the route plan in the event the original distribution system becomes unavailable. The switches may be provided with unique identification codes so that the control node can readily identify the location of the switches. Switches may also be provided at the input to each distribution system so that the control node can route power to the selected distribution system in accordance with the route plan.

The switches may also be bidirectional where the end user becomes a net seller (or electricity source), as in the case of a user having a solar or wind power generator on its premises. The renewable energy generator(s) that would normally be used to power certain user equipment may generate excess power over certain discrete time periods, if, for example, the equipment is not in use over the weekend. The control node 50, having generated a route plan based on the net seller's previously submitted asks, could route the surplus electricity produced by the net seller to a buyer such as a utility (or distribution) company, which could either collect and store the electricity or reroute to an adjacent user to minimize losses, transmission or otherwise.

The transmission systems may include redundant transmission lines to and from various generators and distribution systems to increase overall reliability of the entire network. The use of HVDC is particularly preferred for transmission over long distance in the range of hundreds and thousands of miles as HVDC would minimize transmission loss and avoid the problem of phase and frequency synchronization between different AC transmission systems. Switches addressable by the control node 50 should be strategically placed in the transmission systems where distinct paths of transmission may be defined. In this manner, the route planner of the control node may readily configure the transmission paths for each matched bid and ask to generate a route plan. The route plan is preferably fixed for a predetermined period mutually agreed to by the buyers and sellers through the trading platform.

A route plan can be generated based not only on price but also on quality of service and class of service. An end user would not mind paying a higher price if such user has critical needs. In such event, the control node 50 can offer an optimal route comprising high quality generation, transmission and distribution systems that would satisfy the requirements of the end user. Moreover, the control node 50 can offer a more reliable system as it can dynamically route power through multiple (and redundant or parallel) systems, to the extent available, to the end user and provide such service at a previously agreed blended or average rate or price.

The above discusses the operation of the system in the event the buyer is an end user. Of course, similar operations would be applied in cases where the buyer may, for example, be an electricity retailer or a utility company.

Figure 4:
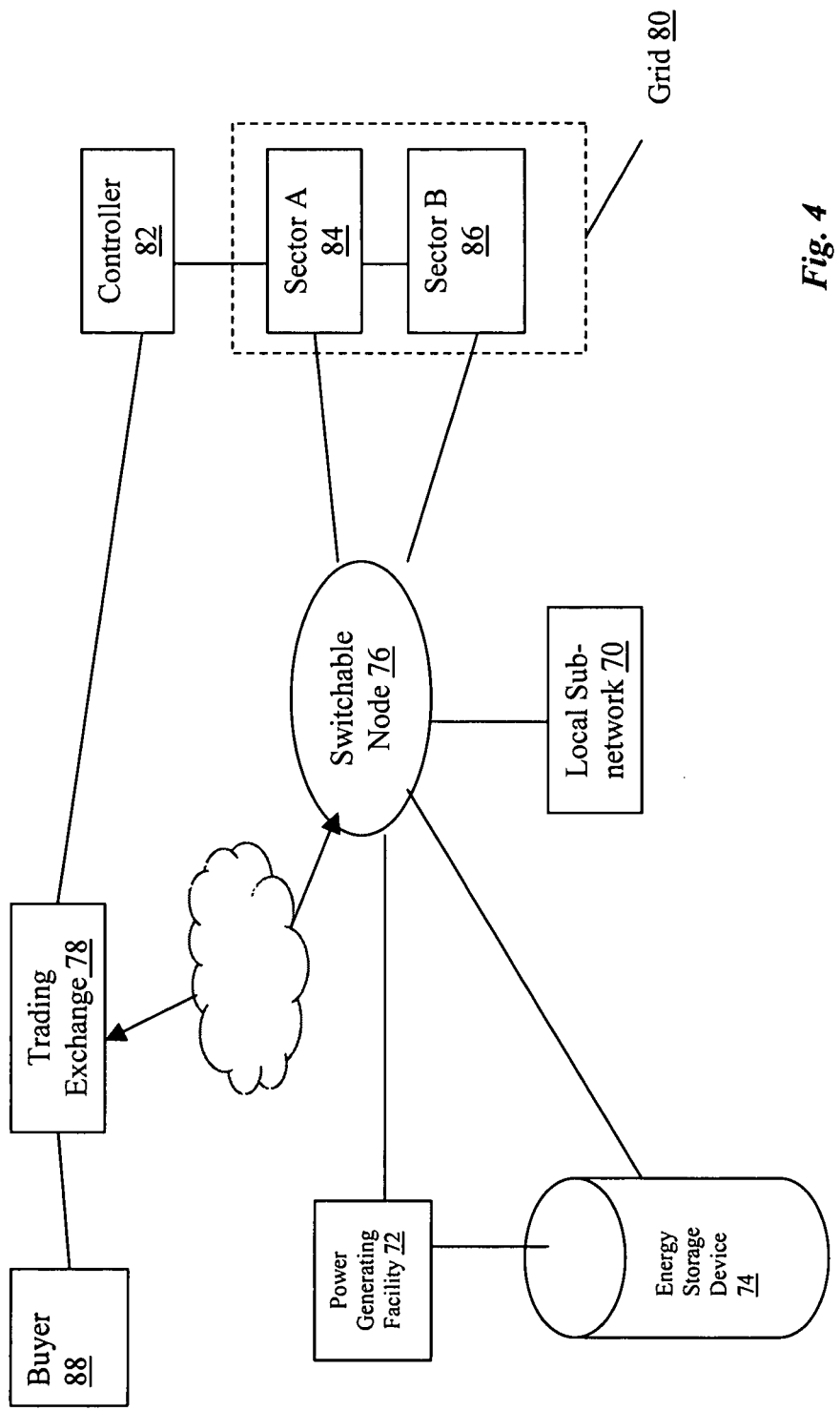
FIG. 4 depicts an embodiment in which a local sub-network unit with a switchable node may selectively sell power back to a utility company.

There is shown in FIG. 4 a local sub-network unit 70 (e.g., a home or office) having a power generating facility 72 such as solar power panels or windmills or any devices that are capable of supplying power from an independent energy source. The power generating facility is preferably equipped with an energy storage device 74 such as a battery, a hydrogen-based fuel cell, or any capacitive device for storing excess energy produced by the power generating facility. The stored energy may later be used by the local sub-network unit or sold to buyers on the trading exchange 78. A switchable node 76 (e.g., a silicon-based TRIAC, a SCR, a bi-directional electro-mechanical switch or any combination thereof) which may include remote control circuitry for remote switching by the exchange or its buying or selling members, in operative communication with an online power trading exchange 78 through a controller, connects the local sub-network unit 70 to the power generating facility 72 and to the grid 80. The grid 80 is also equipped with a controller 82 that is in communication (wirelessly or via BPL or any combination thereof) with the power trading exchange 78, for controlling the power flow between the grid 80 and the sub-network unit 70. Preferably, the sub-network unit 70 is connected to different areas or sectors A and B, referenced as 84, 86 respectively, of grid 80 through the switchable node 76 such that the sub-network unit 70 may draw power from one part of the grid while selling power through another portion of the grid. Under this scenario, a utility company could arbitrage the varying costs of delivering power to the matched buyer using different sectors of its grid so as to realize a higher profit margin from a trade. The costs may vary depending on, for example, the transmission losses through a grid which may be readily computable based on factors such as the transmission voltage, current, and the material characteristics of the transmission lines. The effect is particularly pronounced when, for example, sector A located at the edge of the grid is closer to the matched buyer than sector B located in the heart of the grid such that the transmission costs of delivering power from sector A could realize material savings, even though the sale price of the power presumes delivery from sector B (and its associated higher cost) in accordance with current industry practice. In this manner, the utility company may also "net" the trading activities of the sub-network unit 70 by settling its usage or consumption (i.e. buying) and sales (i.e., supplying power back to the grid using power from its power generating facility) during each billing cycle. Of course, a power meter for monitoring in near real time the power supply and consumption of the sub-network unit 70 is provided, and which is in communication with the trading exchange 78 and the utility company.

This embodiment further advantageously enables the trading exchange to control via the switchable node the power flow between one or more sub-network units, which may be buyers and sellers at a given time, based on limit orders or futures contracts, while permitting the utility company to manage in real time the load balance of its networks. Thus, a buyer 88 on the trading exchange 78 may cause a block of sub-network units 70 to send power to the grid 80 in sector A 84, while these units consume power in sector B 86 of the grid 80. Since these sub-network units 70 are connected to the same grid, the buying and selling of power would not affect the overall network. This is a much more simplified way to trade as it does not require the buyer and seller be connected via a physical line. The buyer 88 on the trading exchange may settle its transactions with the various sub-network units 70 (which are acting as retail sellers) through one payment via the trading exchange 78. As the power feed to and output from the sub-network units 70 are connected to different sectors of the grid, the sub-network units 70 may draw or consume cheaper power from one sector of the grid 80 while selling its power to another sector of the grid 80 at a higher price via futures contracts or the likes to thereby generate a profit gain. Moreover, the availability of stored energy at the local sub-network units 70 can facilitate near instantaneous supply of power to the grid 80 during periods of high demand to thereby making the grid more robust and reliable.

Stored energy, not just the generated power, of the sub-network units may be traded on the exchange thereby providing greater trading flexibility to the sub-network sellers. The stored energy may be traded at times of high demand and thus at a higher price. Also, when the storage device is coupled with a metering device for adjusting the energy output rate, the stored energy may be put back on the grid at a controlled rate. Preferably, the metering device is controlled by the switchable node 76 so that buyers can decide how much of the capacity may be purchased and at what Kwh or ampere level they would like to consume. For example, the buyers may purchase at full or half of the output based on the overall load on the grid on any particular day. Switchable node 76 may be remotely programmed to manage such delivery and can track, measure and report such information to all interested parties.

Figure 5:
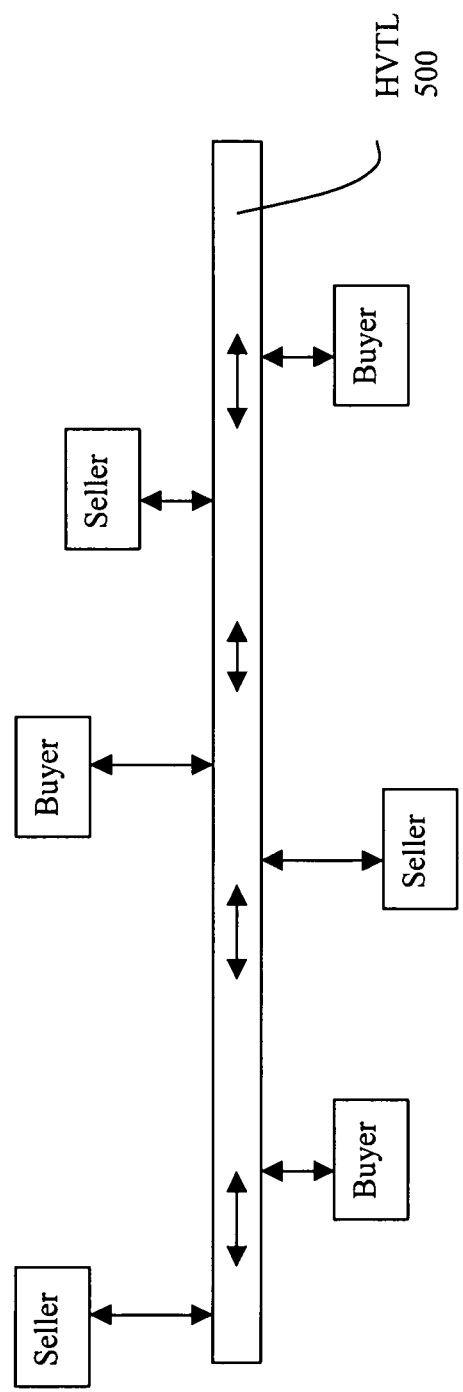
FIG. 5 illustrates an electrical power superhighway for facilitating the trading of power among buyers and sellers.

FIG. 5 shows a high voltage transmission link (HVTL) 500 for exchanging electrical power at high transmission voltage among various buyers and sellers. The HVTL 500 preferably comprises High Voltage Direct Current (HVDC) transmission lines and power electronics including high voltage switches for directing the HVDC current via the HVTL between the buyers and sellers based on settled trades. The HVTL may be a monopolar or a bipolar HVDC transmission line operating at high voltage (e.g., greater than 500 KV), having low loss characteristics, and may be constructed of high temperature superconductor material to greatly reduce transmission loss. Advantageously, such HVTL may be utilized to connect sellers and buyers at great distances such as Iceland with virtually unlimited geothermal energy and the Greater New York Area with poor connectivity to electric power suppliers. An HVDC link is particularly advantageous because it may be connected to multiple buyers and sellers to allow trading among them and to collectively finance the cost of the installation, provisioning, and operation of the HVDC link. Thus, an efficient wholesale market of electrical power trading based on real time supply and consumption is enabled by the system disclosed herein. The HVDC link may be a submarine cable or an above ground conductor. As known to persons of ordinary skill, appropriate AC/DC converter stations would be required to convert the HVDC back to an appropriate alternating current (AC) voltage and frequency for the receiving grid.

Figure 6:
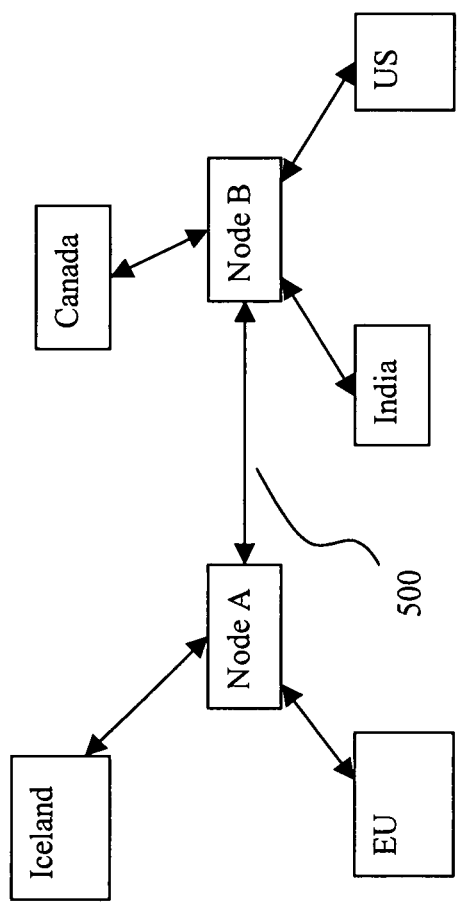
FIG. 6 illustrates an embodiment of the electrical power superhighway comprising HVDC links connecting switch nodes for routing power between buyers and sellers in far-flung regions around the world.

FIG. 6 diagrammatically illustrates an embodiment of the HTVL 500 comprising switch Node A and switch Node B connected through the HVTL. The switch nodes may be high voltage switches manufactured by ABB or Siemens, which are responsive to control node 10 to direct the HVDC to and from a buyer or seller. The switch nodes may allow a plurality of buyers and sellers to collocate or aggregate at a physical location along the HVTL so that they may trade with each other or anyone else connected to the HVTL 500. As shown, Node A is connected to buyers and sellers in Iceland and European Union (EU), and Node B is connected to buyers and sellers in Canada, India, and U.S.

Figure 7:
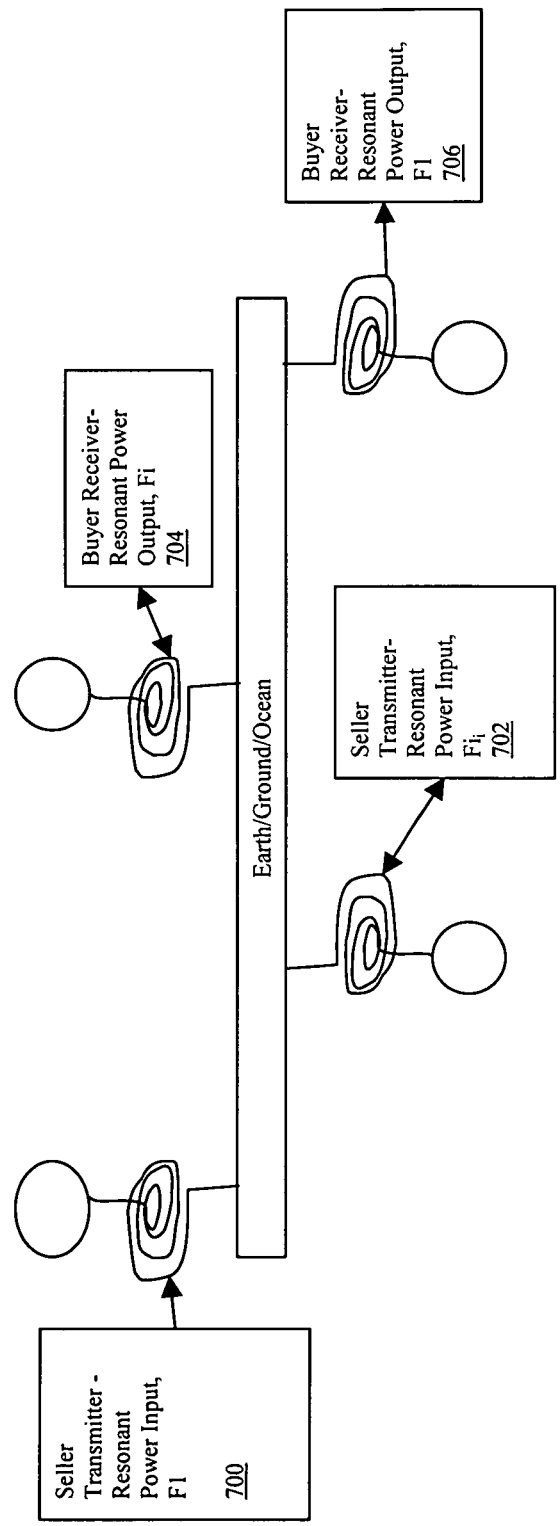
FIG. 7 depicts a wireless energy system based on Tesla coil design.

FIG. 7 illustrates another embodiment of exchanging power using resonant energy transmission technology developed by Nikola Tesla and disclosed in his U.S. Pat. Nos. 645,576 and 1,119,732. The configuration shown is a diagrammatical representation of one of his transmission coil designs disclosed in such patents. As illustrated, transmitters 700, 702 of sellers are connected to receivers 704, 706 of buyers via the earth, a common ground, or the ocean. Each transmitter and receiver is configured to be resonant with each other at a resonant frequency (e.g., F1 or $F_i$) so that power can be transferred between a unique set of transmitters and receivers. In operation, the Seller transmits electrical power to a matched Buyer at a frequency resonant between the coils of the transmitter and the receiver of the Seller and Buyer, respectively. Direct physical connection between the Buyer and Seller is not necessary. All that is required is for the Seller's and Buyer's respective transmitter and receiver connected to a ground (e.g., the earth or the ocean). An advantage of this technology is that it alleviates the need for costly physical transmission links connecting the buyers and sellers. Further disclosure of this technology and implementation is disclosed in my U.S. Provisional Application No. 61/091,460, entitled Wireless Energy Transfer System and filed on Aug. 25, 2008, which is incorporated herein by reference in its entirety. It is contemplated that the transmitter and receiver coils may be automatically configured (e.g., by the control node 10) to transmit and receive at the desired frequency such that only a unique set of transmitter and receiver are in operative communication or connection.

Although the invention has been described in detail for the purpose of illustration, it is to be understood that such detail is solely for that purpose and that variations can be made therein by those skilled in the art without departing from the spirit and scope of the invention except as it may be limited by the claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. A method for dynamically distributing electric power in an electric network having distribution networks, comprising the steps of:
   (a) receiving by a control node bids and asks of electric power and a signal from one or more feedback sensors related to current supply and demand conditions on an electric network including power consumption by end users through a feedback loop;
   (b) matching by the control node the bids and asks; and
   (c) generating by the control node a route plan for delivering electric power between buyers and sellers based on the matched bids and asks, the signal from the one or more feedback sensors received through the feedback loop, and at least one of price, quality of service, and class of service, the route plan adjusting power flow to the electric network to balance load and resources on the electric network.

2. The method of claim 1, wherein the control node is incorporated in an electrical substation.

3. The method of claim 1, wherein said step (a) further comprises receiving bids and asks in a spot market.

4. The method of claim 1, wherein said step (a) comprises receiving bids and asks via a wide area network.

5. The method of claim 4, wherein said step (a) comprises inputting the bids and asks to the wide area network via respective buyer on-site devices and seller on-site devices.

6. The method of claim 1, further comprising the step (d) of receiving current supply and demand conditions on an electric network via a feedback loop and using the current supply and demand for dynamically matching the bids and asks.

7. The method of claim 6, wherein said step (c) further comprises generating a route plan for each of the matches using the current supply and demand conditions.

8. The method of claim 6, wherein said step (b) comprises continuously updating the matches based on changes in the bids and asks.

9. The method of claim 1, wherein said step (b) comprises continuously updating the matches based on changes in the bids and asks.

10. The method of claim 9, wherein said step (b) further comprises matching an equal share of the electric power from a seller with the lowest asking price to all bids of buyers to which the electric power is available.

11. The method of claim 9, wherein said step (b) further comprises matching a share of the electric power from a seller with the lowest asking price to all bids of buyers to which the electric power is available, wherein the share is proportional to the amount of electric power demanded by the buyers.

12. The method of claim 9, wherein said step (b) further comprises matching the ask from a seller with the lowest asking price first to the bids of buyers with the highest amount of electric power demanded.

13. The method of claim 1, wherein the bids and asks matched by the control node form settled trades between buyers and sellers.

14. The method of claim 1, wherein the route plan is transmitted to a central control of an electric power transmission network.

15. The method of claim 14, wherein the central control effects the route plan by controlling addressable switches.

16. The method of claim 15, wherein the addressable switches are provided with unique identification codes for identifying their locations on the electric network.

17. The method of claim 16, wherein the addressable switches are provided at input to each distribution network so that the control node can route electric power to one or more distribution networks in accordance with the route plan.

18. The method of claim 14, wherein the electric power transmission network uses high voltage direct current.

19. The method of claim 18, further comprising the step of providing AC/DC conversion for converting between direct current and alternating current.

20. The method of claim 14, wherein the electric transmission network uses resonant energy transmission technology.

21. The method of claim 1, further comprising the step of determining by the control node whether a matched bid and ask is possible based on supply and demand information relating to an electric network.

22. The method of claim 21, wherein the supply and demand information is provided to the control node by the central control of the electric network.

23. The method of claim 21, wherein the supply and demand information is provided to the control node by one of wireline and wireless transceivers.

24. The method of claim 23, wherein the supply and demand information is provided to the control node via a power line.

25. The method of claim 24, wherein the supply and demand information is transmitted using BPL protocol.

26. The method of claim 24, wherein the supply and demand information is transmitted using wireless access points.

27. The method of claim 1, wherein the class of service or quality of service includes at least one of reliability index and voltage variances.

28. A system for dynamically distributing electric power in an electric network having distribution systems, comprising:
a control node that includes at least one processor and memory combined with the at least one processor, the control node for (a) receiving bids and asks of electric power and a signal from one or more feedback sensors related to current supply and demand conditions on an electric network including power consumption by end users through a feedback loop, (b) matching the received bids and asks, and (c) generating a route plan for delivering electric power between buyers and sellers based on the matched bids and asks, the signal from the one or more feedback sensors received through the feedback loop, and at least one of price, quality of service, and class of service, the route plan adjusting power flow to the electric network to balance load and resources on the electric network.

29. The system of claim 28, wherein said control node is connectable to a wide area network for receiving the bids and asks from buyers and sellers.

30. The system of claim 28, wherein said control node comprises a deal maker module for matching said bids and asks and a route planner module for planning a route for effecting the matched bids and asks.

31. The system of claim 30, wherein said control node comprises an accounting module connectable for determining the actual usage of the buyer and determining the charge to the buyer.

32. The system of claim 28, further comprising:
A switch node in operative communication with the control node for switching electric power between in accordance with the route plan.

33. The system of claim 32, wherein the switch node is located at the input to a distribution system.

34. The system of claim 32, wherein the switch node includes addressable switches that are addressable by unique identification codes indicative of locations of the addressable switches in the electric network so that the control node can readily identify the locations of the addressable switches.

35. The system of claim 32, further comprising energy storage means connected to the switch node.

36. The system of claim 28, further comprising a high voltage transmission link for transmission of electric power.

37. The system of claim 36, wherein the high voltage transmission link includes a high voltage direct current link.

38. The system of claim 37, further comprising an AC/DC converter station, and wherein the high voltage direct current link is connected to an alternating current network via the AC/DC converter station.

39. The system of claim 28, further comprising feedback means for feedback of power consumption information to the control node.

40. The system of claim 39, wherein the feedback means includes at least one of wireline transceiver, wireless transceiver, and power line.

41. The system of claim 39, further comprising an accountant module for computing and settling trades based on the power consumption information.

42. The system of claim 28, further comprising a wireless energy transmitters and receivers for transmission of electric power.

* * * * *